(12) United States Patent
Morimoto

(10) Patent No.: US 9,337,904 B2
(45) Date of Patent: May 10, 2016

(54) COMMUNICATION APPARATUS

(75) Inventor: Shigeru Morimoto, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 204 days.

(21) Appl. No.: 14/123,357

(22) PCT Filed: Jul. 26, 2012

(86) PCT No.: PCT/JP2012/004772
§ 371 (c)(1),
(2), (4) Date: Dec. 2, 2013

(87) PCT Pub. No.: WO2013/132546
PCT Pub. Date: Sep. 12, 2013

(65) Prior Publication Data
US 2014/0104044 A1    Apr. 17, 2014

(30) Foreign Application Priority Data
Mar. 6, 2012   (JP) .................................. 2012-048992

(51) Int. Cl.
| | | |
|---|---|---|
| H04Q 5/22 | (2006.01) |
| G08C 19/12 | (2006.01) |
| G08B 23/00 | (2006.01) |
| G08B 13/26 | (2006.01) |
| G06K 5/00 | (2006.01) |
| G06K 19/00 | (2006.01) |

(Continued)

(52) U.S. Cl.
CPC .......... *H04B 5/0062* (2013.01); *G06K 7/10009* (2013.01); *G06K 19/0715* (2013.01); *G06K 19/0726* (2013.01); *H04B 5/0075* (2013.01)

(58) Field of Classification Search
CPC ............ G06K 7/0008; G06K 19/0715; G06K 19/0726; G06K 7/10009; H04B 5/0062; H04B 5/0075
See application file for complete search history.

(56) References Cited

U.S. PATENT DOCUMENTS 6,340,932 B1 *  1/2002  Rodgers et al. ............. 340/572.7
7,456,752 B2 * 11/2008  Oberle .......................... 340/604

(Continued)

FOREIGN PATENT DOCUMENTS

JP     2001-344574 A     12/2001
JP     2007-060632 A      3/2007

(Continued)

OTHER PUBLICATIONS

International Search Report for International Application No. PCT/JP2012/004772, dated Aug. 28, 2012, 1 page.

(Continued)

*Primary Examiner* — Steven Lim
*Assistant Examiner* — Muhammad Adnan
(74) *Attorney, Agent, or Firm* — Brinks Gilson & Lione

(57) ABSTRACT

An RFID tag includes an antenna coil configured to transmit and receive a signal through near field communication, a signal processing circuit configured to process the signal transmitted and received by the antenna coil, a capacitive element arranged in series between the antenna coil and the signal processing circuit, and a control unit configured to control the capacity value of the capacitive element. The control unit changes the capacity value of the capacitive element according to whether a voltage is applied from an external power supply.

3 Claims, 10 Drawing Sheets

(51) Int. Cl.
  *H04B 5/00* (2006.01)
  *G06K 7/10* (2006.01)
  *G06K 19/07* (2006.01)

(56) References Cited

U.S. PATENT DOCUMENTS

| | | | |
|---|---|---|---|
| 8,749,358 B2 * | 6/2014 | Hennig et al. | 340/13.37 |
| 2002/0017980 A1 * | 2/2002 | Uozumi | 340/10.3 |
| 2006/0220856 A1 * | 10/2006 | Shaffer et al. | 340/572.1 |
| 2007/0058563 A1 * | 3/2007 | Ishibashi et al. | 370/252 |
| 2009/0002175 A1 * | 1/2009 | Waters | 340/572.5 |
| 2009/0146787 A1 * | 6/2009 | Park et al. | 340/10.1 |
| 2009/0146809 A1 * | 6/2009 | Kientz | 340/572.1 |
| 2009/0231138 A1 * | 9/2009 | Lai et al. | 340/572.4 |
| 2010/0060456 A1 * | 3/2010 | Forster | 340/572.7 |
| 2010/0277282 A1 * | 11/2010 | Kang | H04B 5/0037 340/10.1 |
| 2011/0025263 A1 * | 2/2011 | Gilbert | H02J 7/0044 320/108 |
| 2011/0142040 A1 * | 6/2011 | Funamoto et al. | 370/389 |
| 2011/0183629 A1 * | 7/2011 | Walley | 455/68 |
| 2011/0213232 A1 * | 9/2011 | Stevenson | A61B 5/04 600/373 |
| 2011/0215646 A1 * | 9/2011 | Morishima | H02J 9/00 307/66 |
| 2012/0135681 A1 * | 5/2012 | Adams et al. | 455/41.1 |
| 2013/0119924 A1 * | 5/2013 | Kasturi et al. | 320/108 |
| 2013/0289334 A1 * | 10/2013 | Badstibner | A61M 1/127 600/16 |
| 2014/0142876 A1 * | 5/2014 | John et al. | 702/60 |

FOREIGN PATENT DOCUMENTS

| | | |
|---|---|---|
| JP | 2009-543442 A | 12/2009 |
| JP | 2011-130062 A | 6/2011 |
| WO | WO 2008/002305 A1 | 1/2008 |
| WO | WO 2010/035256 A2 | 4/2010 |

OTHER PUBLICATIONS

Extended European Search Report in corresponding European Application No. 12870779.1, dated Feb. 25, 2015, 8 pages.

\* cited by examiner

FIG. 13

CAPACITY VALUE/INDUCTOR (ANTENNA COIL)

| COMMUNICATION STANDARD / EXTERNAL POWER SUPPLY | Type A | Type B | Type F |
|---|---|---|---|
| APPLIED | C1/L1 | C2/L2 | C3/L3 |
| NOT APPLIED | C4/L4 | C5/L5 | C6/L6 |

COMMUNICATION APPARATUS

This application is a 371 application of PCT/JP2012/004772 having an international filing date of Jul. 26, 2012, which claims priority to JP2012-048992 filed Mar. 6, 2012, the entire contents of which are incorporated herein by reference.

TECHNICAL FIELD

The present invention relates to a communication apparatus that performs communication using near field communication.

BACKGROUND ART

There has been proposed a technique for performing near field communication between apparatuses using RFID (Radio Frequency Identification). In such near field communication, a communication distance between a reader/writer and an RFID tag is different depending on a communication standard of the near field communication. As the communication standard of the near field communication, there are three types: Type A, Type B, and Type F currently. Since modulation systems and the like are different in the respective communication standards, optimum matching conditions for antennas are different.

Usually, matching conditions for antennas of the reader/writer and the RFID tag are fixed in advance. Therefore, when a reader/writer and an RFID tag corresponding to a plurality of communication standards communicate, if the matching conditions are adjusted to one communication standard, it is likely that a communication distance cannot be sufficiently secured in the other communication standards.

The communication distance between the reader/writer and the RFID tag are also different according to whether a voltage is applied from an external power supply. Further, depending on the type of the antenna of the reader/writer, a matching condition is sometimes different from a matching condition for the antenna of the RFID tag. Furthermore, manufacturing fluctuation is present in the RFID tag. A resonance frequency changes according to the manufacturing fluctuation and affects a communication distance.

For example, Patent Literature 1 discloses that a variable capacitive element of a resonance circuit tuning system is adjusted in order to detect at least one of an electric current and a voltage of an antenna coil and change resonance impedance of the antenna coil on the basis of the detection.

In Patent Literature 1, the capacitive element is adjusted using a voltage value of the antenna coil. However, the frequency of a carrier wave and the frequency of a data modulation signal are greatly different depending on a communication standard. When the RFID tag is applied with a voltage from the external power supply to operate, the RFID tag does not operate with the energy of a carrier wave from the reader/writer. Therefore, the communication distance is often increased by adjusting matching of the antenna of the RFID tag to resonate at the frequency of the data modulation signal rather than the frequency of the carrier wave that maximizes the voltage value of the antenna coil.

CITATION LIST

Patent Literature

Patent Literature 1: Japanese Translation of PCT Application No. 2009-543442

SUMMARY OF THE INVENTION

The present invention has been devised in order to solve the problems and it is an object of the present invention to provide a communication apparatus that can adjust a communication distance to an optimum communication distance.

A communication apparatus according to an aspect of the present invention includes: an antenna configured to transmit and receive a signal through near field communication; a signal processing circuit configured to process the signal transmitted and received by the antenna; a capacitive element arranged in series between the antenna and the signal processing circuit; and a control unit configured to control a capacity value of the capacitive element. The control unit changes the capacity value of the capacitive element according to whether a voltage is applied from an external power supply.

With this configuration, the antenna transmits and receives a signal through the near field communication. The signal processing circuit processes the signal transmitted and received by the antenna. The capacitive element is arranged in series between the antenna and the signal processing circuit. The control unit controls a capacity value of the capacitive element. The control unit changes the capacity value of the capacitive element according to whether a voltage is applied from the external power supply.

According to the present invention, the capacitance value of the capacitive element is changed according to whether a voltage is applied from the external power supply. Therefore, it is possible to adjust a communication distance to an optimum communication distance when a voltage is applied from the external power supply and when a voltage is not applied from the external power supply.

The objects, characteristics, and advantages of the present invention are made more obvious by the following detailed explanation and the accompanying drawings.

BRIEF DESCRIPTION OF THE DRAWINGS

FIG. 13 is a diagram showing an example of a reference table stored in a memory.

DESCRIPTION OF EMBODIMENTS

An embodiment of the present invention is explained below with reference to the accompanying drawings. Note that the embodiment explained below is an example of embodying the present invention and does not limit a technical scope of the present invention.

Figure 1:
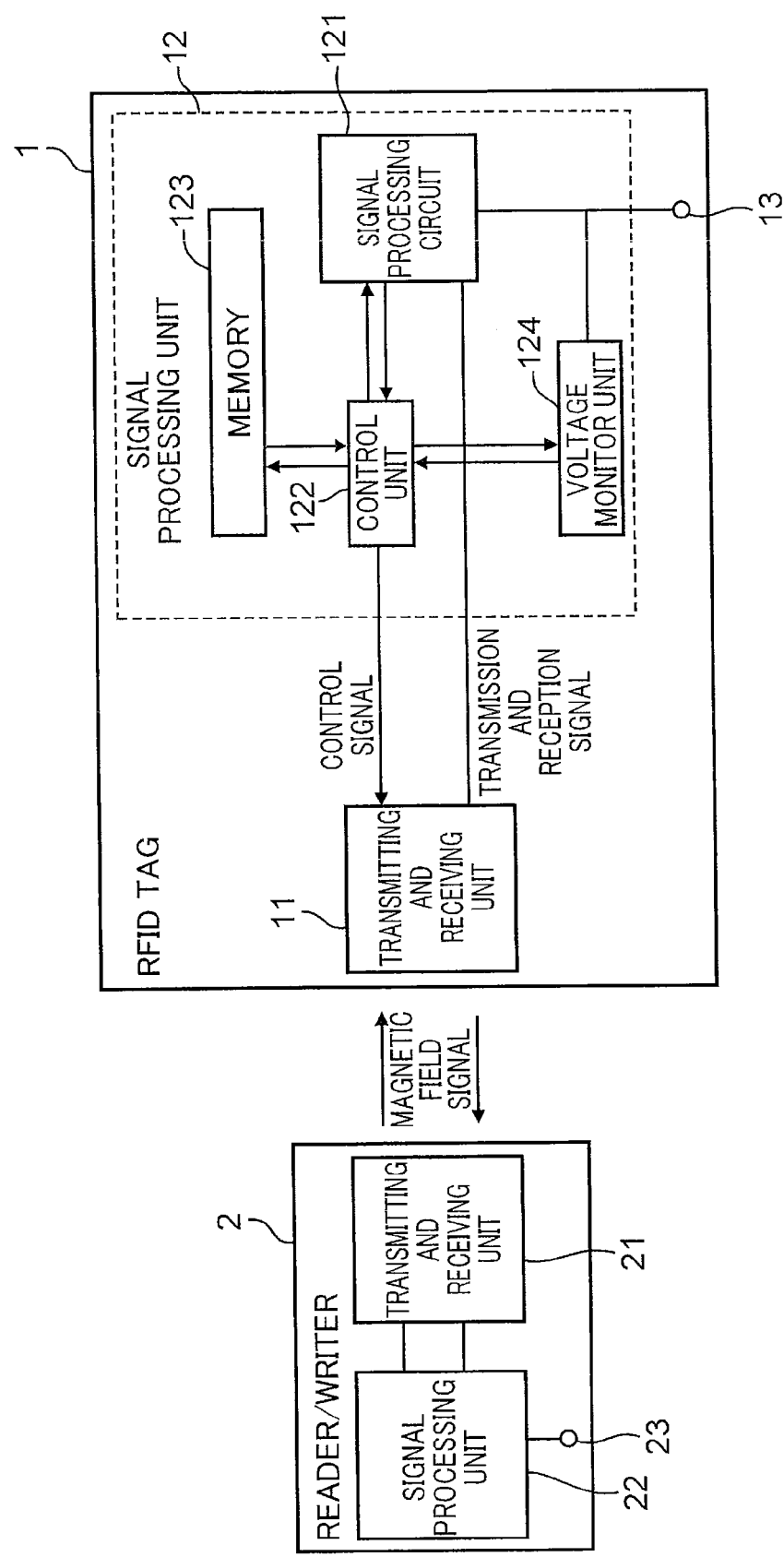
FIG. 1 is a diagram showing an overall configuration of a communication system in an embodiment of the present invention.
Figure 2:
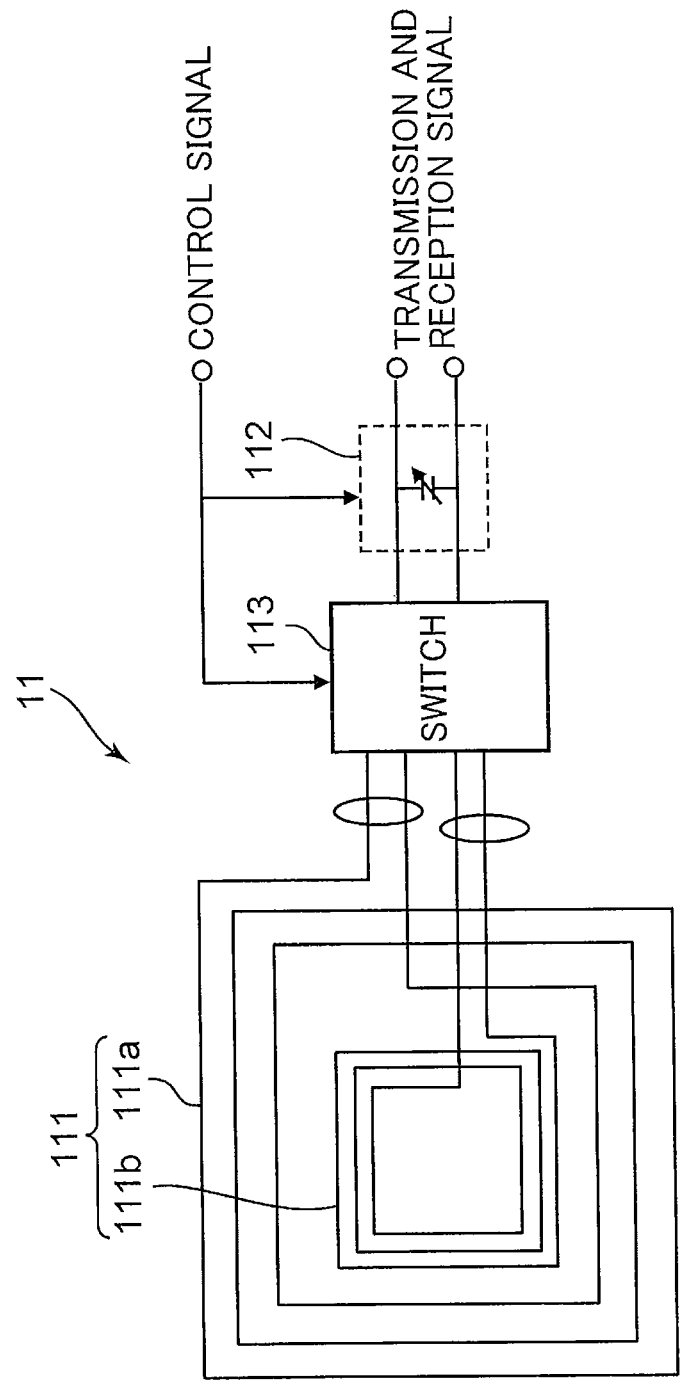
FIG. 2 is a diagram showing a detailed configuration of a transmitting and receiving unit shown in FIG. 1.

FIG. 1 is a diagram showing an overall configuration of a communication system in an embodiment of the present invention. FIG. 2 is a diagram showing a detailed configuration of a transmitting and receiving unit shown in FIG. 1. The communication system shown in FIG. 1 includes an RFID tag 1 and a reader/writer 2. Note that, in some case, the reader/writer 2 is referred to as initiator as well and the RFID tag 1 is referred to as target as well.

The RFID tag 1 and the reader/writer 2 transmit and receive a signal each other through near field communication.

The RFID tag 1 includes a transmitting and receiving unit 11, a signal processing unit 12, and an external power supply terminal 13. Antenna coils of the RFID tag 1 and the reader/writer 2 are flux-coupled to each other, whereby a signal is transmitted.

The transmitting and receiving unit 11 transmits a signal to the reader/writer 2 and receives a signal from the reader/writer 2. Note that the transmission signal is output from the signal processing unit 12 to the transmitting and receiving unit 11 and the reception signal is output from the transmitting and receiving unit 11 to the signal processing unit 12.

As shown in FIG. 2, the transmitting and receiving unit 11 includes an antenna coil 111, a capacitative element 112, and a switch 113. The antenna coil 111 includes a first antenna coil 111a and a second antenna coil 111b.

The second antenna coil 111b has inductance different from the inductance of the first antenna coil 111a. In this embodiment, as the near field communication, RFID in an HF (High Frequency) band performed using a 13.5 MHz band is used. The antenna coil 111 (the first antenna coil 111a or the second antenna coil 111b) receives a signal transmitted from the reader/writer 2.

The capacitive element 112 is, for example, a variable capacitor and is arranged in series between the antenna coil 111 (the first antenna coil 111a and the second antenna coil 111b) and a signal processing circuit 121. The capacitive element 112 can change a capacity value according to a control signal from a control unit 122.

The switch 113 switches an antenna coil to any one of the first antenna coil 111a and the second antenna coil 111b according to a control signal from the control unit 122 and connect any one of the first antenna coil 111a and the second antenna coil 111b and the signal processing circuit 121.

The signal processing unit 12 includes the signal processing circuit 121, the control unit 122, a memory 123, and a voltage monitor unit 124. The external power supply terminal 13 is a terminal that receives the supply of a voltage from an external power supply.

The voltage monitor unit 124 monitors whether a voltage is applied to the external power supply terminal 13 from the outside. The voltage monitor unit 124 creates operation mode information representing whether a voltage is applied to the external power supply terminal 13 from the outside and outputs the operation mode information to the control unit 122. The voltage monitor unit 124 monitors a voltage supplied from the external power supply terminal 13 to the signal processing circuit 121. The voltage monitor unit 124 receives an operation mode readout command from the control unit 122 and outputs the operation mode information to the control unit 122 according to the received operation mode readout command. When a voltage is detected, the voltage monitor unit 124 determines that an operation mode is an operation mode for operating with voltage supply from the external power supply. When a voltage is not detected, the voltage monitor unit 124 determines that the operation mode is an operation mode for operating with magnetic field energy from the transmitting and receiving unit 11 that receives a magnetic field signal.

The signal processing circuit 121 processes signals transmitted and received by the transmitting and receiving unit 11. The signal processing circuit 121 converts a reception signal from the transmitting and receiving unit 11 from analog to digital and converts a transmission signal to the transmitting and receiving unit 11 from digital to analog. The signal processing circuit 121 operates in the operation mode for operating with voltage supply from the external power supply and the operation mode for operating with magnetic field energy from the transmitting and receiving unit 11 that receives a magnetic field signal.

The memory 123 stores a reference table that associates capacity values and antenna coils with whether a voltage is applied from the external power supply and with a plurality of communication standards.

Note that, although, in this embodiment, the memory 123 stores the reference table that associates capacity values and antenna coils with whether a voltage is applied from the external power supply and with a plurality of communication standards, the present invention is not specifically limited to this. When the RFID tag 1 is adapted to only one communication standard, the memory 123 may store a reference table that associate capacity values and antenna coils with whether a voltage is applied from the external power supply. The memory 123 may store a reference table that associates capacity values with whether a voltage is applied from the external power supply. Further, the memory 123 may store a reference table that associates antenna coils with whether a voltage is applied from the external power supply.

The control unit 122 outputs a control signal for controlling a capacity value of the capacitive element 112 to the transmitting and receiving unit 11. The control unit 122 outputs a control signal for switching the first and second antenna coils 111a and 111b, the inductances of which are different from each other, to the transmitting and receiving unit 11. The control unit 122 changes the capacity value of the capacitive element 112 according to whether a voltage is applied from the external power supply. The control unit 122 controls the switch 113 to switch the antenna coil to any one of a plurality of antenna coils (the first antenna coil 111a and the second antenna coil 111b), according to whether a voltage is applied from the external power supply.

The control unit 122 changes the capacity value of the capacitive element 112 such that a communication distance is longer when a voltage is applied from the external power supply than when a voltage is not applied from the external power supply. The control unit 122 controls the switch 113 to switch the antenna coil to any one of the plurality of antenna coils such that a communication distance is longer when a voltage is applied from the external power supply than when a voltage is not applied from the external power supply.

The control unit 122 reads out, from the reference table, a capacity value and an antenna coil corresponding to communication standard information included in a received signal and operation mode information output by the voltage monitor unit 124, changes the present capacity value of the capacitive element 112 to the read-out capacity value, and switches the present antenna coil to the read-out antenna coil.

Note that the control unit 122 may read out, from the reference table, a capacity value corresponding to operation mode information output by the voltage monitor unit 124 and change the present capacity value of the capacitive element 112 to the read-out capacity value. The control unit 122 may read out, from the reference table, a capacity value corresponding to communication standard information included in a received signal and operation mode information output by the voltage monitor unit 124 and change the present capacity value of the capacitive element 112 to the read-out capacity value. Further, the control unit 122 may read out, from the reference table, a capacity value and an antenna coil corresponding to operation mode information output by the voltage monitor unit 124, change the present capacity value of the capacitive element 112 to the read-out capacity value, and switch the present antenna coil to the read-out antenna coil.

Further, when communication is interrupted during data communication or when, although polling communication is successful, data communication does not start, the signal processing circuit 121 carries out a reception operation for a data signal while the control unit 122 changes a capacity value. The control unit 122 controls the capacitive element 112 with the capacity value at a point when the data signal is received.

The reader/writer 2 includes a transmitting and receiving unit 21, a signal processing unit 22, and an external power supply terminal 23. Note that, since the configurations of the transmitting and receiving unit 21, the signal processing unit 22, and the external power supply terminal 23 are the same as the configurations of the transmitting and receiving unit 11, the signal processing unit 12, and the external power supply terminal 13 of the RFID tag 1, explanation of the configurations is omitted.

Figure 3:
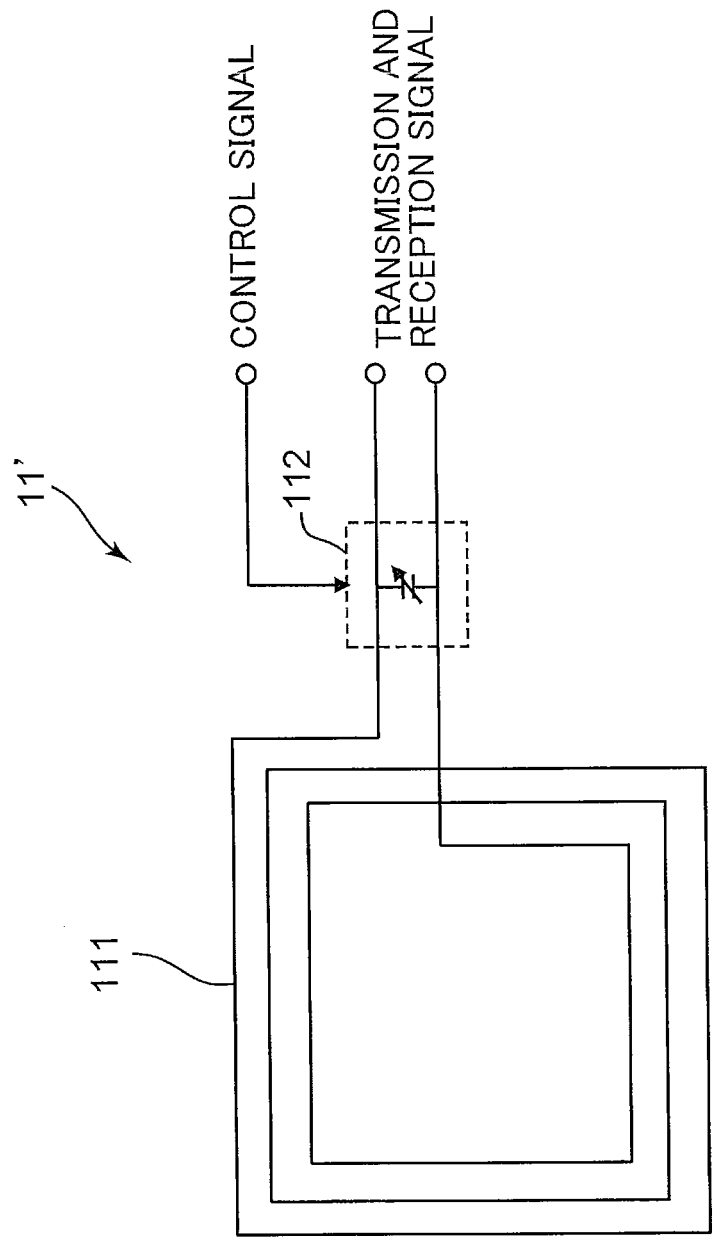
FIG. 3 is a diagram showing a detailed configuration of a transmitting and receiving unit in a modification of the embodiment.

Note that, although the transmitting and receiving unit 11 shown in FIG. 2 includes the first and second antenna coils 111a and 111b, the capacitive element 112, and the switch 113, the present invention is not specifically limited to this. The transmitting and receiving unit 11 may include one antenna coil 111 and the capacitive element 112. FIG. 3 is a diagram showing a detailed configuration of a transmitting and receiving unit in a modification of this embodiment.

As shown in FIG. 3, a transmitting and receiving unit 11' in the modification of this embodiment includes the antenna coil 111 and the capacitive element 112. The transmitting and receiving unit 11' in the modification of this embodiment can change a capacity value of the capacitive element 112 but cannot switch an antenna coil.

The configuration of the transmitting and receiving unit 11' in the modification of this embodiment is the same as the configuration of the transmitting and receiving unit 11 shown in FIG. 2 except that an antenna coil is not switched. Therefore, explanation of the configuration is omitted.

The transmitting and receiving unit 11 in this embodiment includes the two antenna coils. However, the present invention is not specifically limited to this. The transmitting and receiving unit 11 may include three or more antenna coils.

Note that, in this embodiment, the RFID tag 1 and the reader/writer 2 are equivalent to an example of a communication device, the antenna coil 111 is equivalent to an example of an antenna, the signal processing circuit 121 is equivalent to an example of a signal processing circuit, the capacitive element 112 is equivalent to an example of a capacitive element, the control unit 122 is equivalent to an example of a control unit, the first antenna coil 111a and the second antenna coil 111b are equivalent to an example of a plurality of antenna coils, the switch 113 is equivalent to an example of a switch, the memory 123 is equivalent to an example of a storing unit, and the voltage monitor unit 124 is equivalent to an example of a voltage monitor unit.

Figure 4:
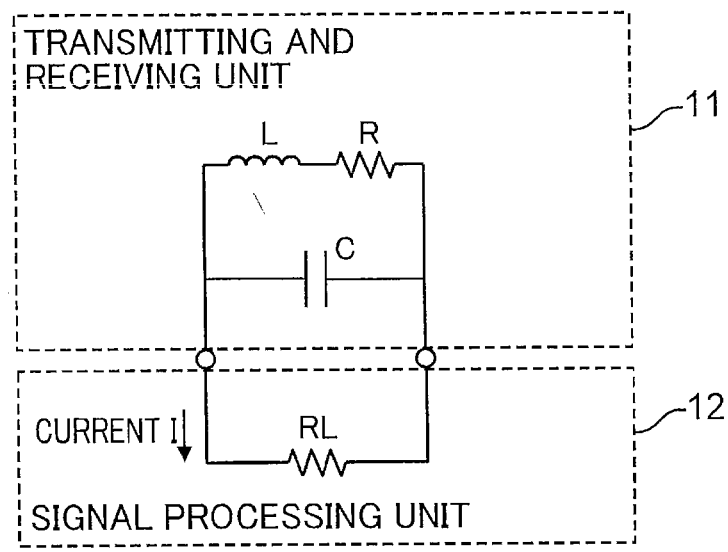
FIG. 4 is a diagram representing input equivalent resistance of the transmitting and receiving unit and a signal processing unit shown in FIG. 1.
Figure 5:
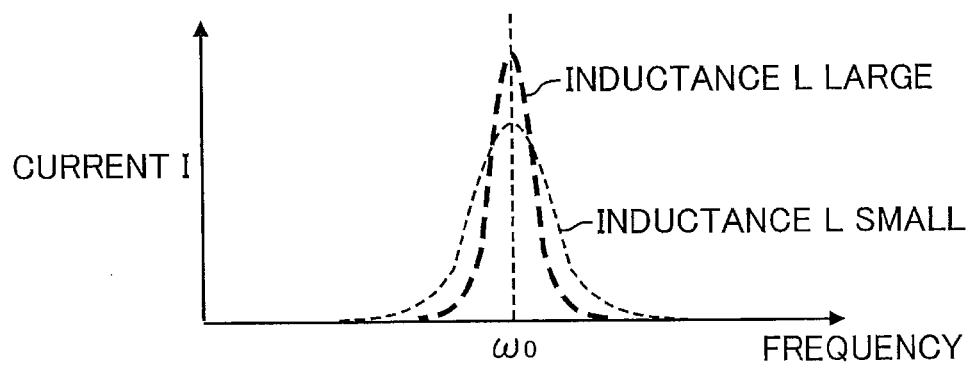
FIG. 5 is a diagram showing a resonance characteristic of the transmitting and receiving unit shown in FIG. 1.

Next, a resonance characteristic of the transmitting and receiving unit 11 shown in FIG. 1 is explained. FIG. 4 is a diagram representing input equivalent resistance of the transmitting and receiving unit and the signal processing unit shown in FIG. 1. FIG. 5 is a diagram showing a resonance characteristic of the transmitting and receiving unit shown in FIG. 1. Note that, in FIG. 5, the ordinate represents a current value I and the abscissa represents a frequency. In the configuration diagram shown in FIG. 4, to simplify explanation, one antenna coil is shown.

As shown in FIG. 4, in terms of a circuit, the transmitting and receiving unit 11 is configured by an inductor (inductance L), a resistor (a resistance value R), and a capacitive element (a capacity C). In terms of a circuit, the signal processing unit 12 is configured by a load resistor (a resistance value RL).

In this case, a selectivity Q value is $RL(L/C)^{0.5}$ and a resonance frequency $\omega_0$ is $1/(LC)^{0.5}$. As shown in FIG. 5, when the inductance L increases, the resonance characteristic becomes steep, and a current value peak I increases. On the other hand, when the inductance L decreases, the resonance characteristic becomes gentle and the current value peak I decreases.

Usually, when a voltage is not applied from the external power supply and the signal processing circuit 121 operates with magnetic field energy of the antenna coil, a communication distance is short compared with the time when a voltage is not applied from the external power supply. In this way, the communication distance changes according to presence or absence of a voltage from the external power supply. It is possible to increase the communication distance by changing the capacity value of the capacitive element and the inductance of the antenna coil according to whether a voltage is applied from the external power supply.

Further, currently, in the near field communication, there are three kinds of communication standards: "Type A", "Type B", and "Type F". In the three communication standard, a matching condition for antennas is different. Therefore, it is possible to increase the communication distance by changing the capacity value of the capacitive element and the inductance of the antenna coil according to by the near field communication in which communication standard of the three communication standards communication is performed.

Figure 6:
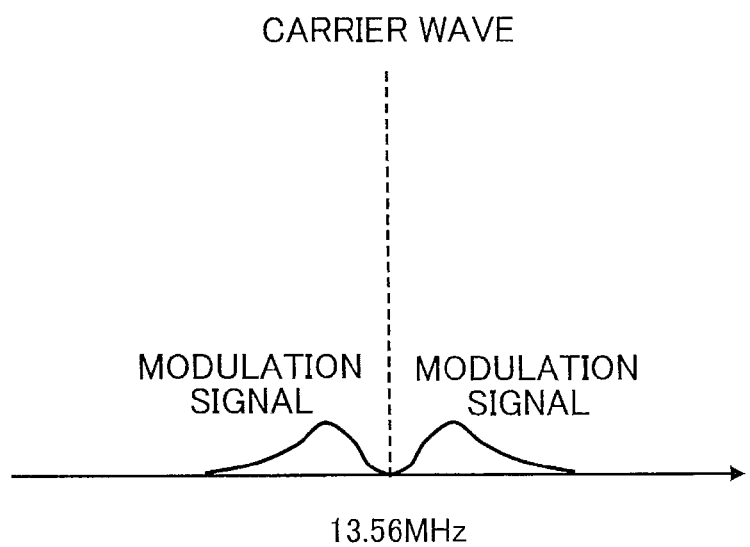
FIG. 6 is a diagram showing a spectrum obtained when a communication standard is "Type F".
Figure 7:
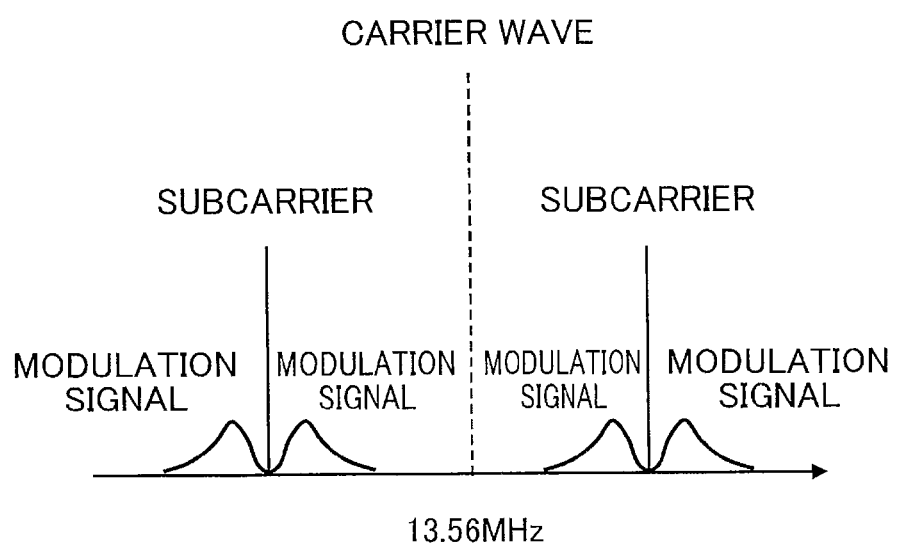
FIG. 7 is a diagram showing a spectrum obtained when the communication standard is "Type B".

FIG. 6 is a diagram showing a spectrum obtained when the communication standard is "Type F". FIG. 7 is a diagram showing a spectrum obtained when the communication standard is "Type B". Note that the abscissa of FIGS. 6 and 7 represents a frequency.

As shown in FIG. 6, when the communication standard is "Type F", a modulation signal is present near a 13.56 MHz carrier wave. As shown in FIG. 7, when the communication standard is "Type B", a modulation signal is present near two subcarriers of the 13.56 MHz carrier wave.

In this way, the position of the modulation signal is different depending on the communication standard.

Figure 8:
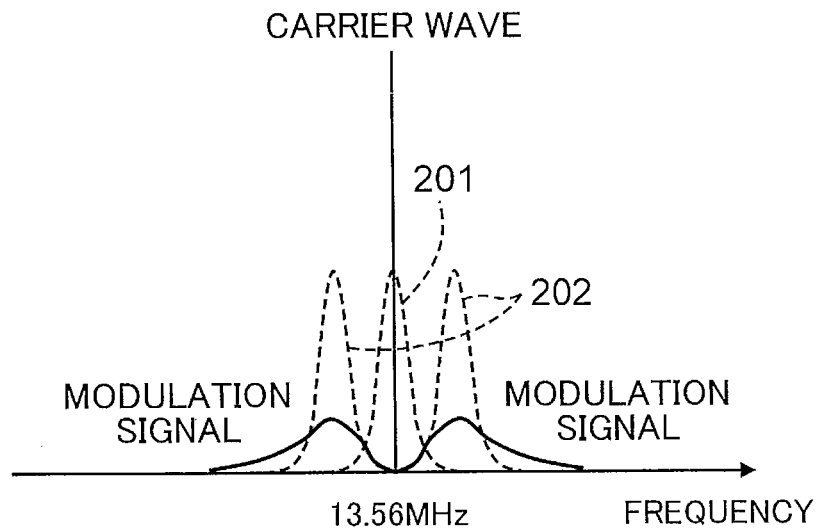
FIG. 8 is a diagram for explaining resonance characteristics obtained when the communication standard is "Type F" and a capacitance value is changed.
Figure 9:
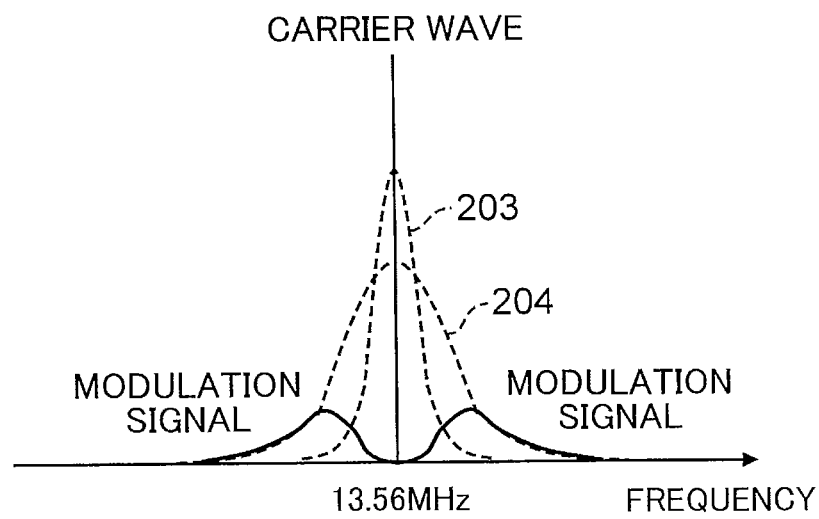
FIG. 9 is a diagram for explaining resonance characteristics obtained when the communication standard is "Type F" and the capacitance value and inductance are changed.

FIG. 8 is a diagram for explaining resonance characteristics obtained when the communication standard is "Type F"

and the capacitance value is changed. FIG. 9 is a diagram for explaining resonance characteristics obtained when the communication standard is "Type F" and the capacitance value and the inductance are changed.

A resonance characteristic 201 shown in FIG. 8 represents a resonance characteristic obtained when a voltage is not applied from the external power supply. A resonance characteristic 202 represents an example of a resonance characteristic obtained when a voltage is applied from the external power supply. A resonance characteristic 203 shown in FIG. 9 represents a resonance characteristic obtained when a voltage is not applied from the external power supply. A resonance characteristic 204 represents an example of a resonance characteristic obtained when a voltage is applied from the external power supply.

In FIG. 8, when a voltage is not applied from the external power supply, the control unit 122 sets the capacity value of the capacitive element 112 such that the resonance characteristic 201 is the maximum at the frequency of a carrier wave. When a voltage is applied from the external power supply, the control unit 122 sets the capacity value of the capacitive element 112 such that the resonance characteristic 202 the maximum at the frequency of a modulation signal near the carrier wave. Consequently, it is possible to increase a communication distance.

As shown in FIG. 9, when a voltage is not applied from the external power supply, the control unit 122 sets the capacity value of the capacitive element 112 and the inductance of the antenna coil such that the resonance characteristic 201 is the maximum and steep at the frequency of the carrier wave. When a voltage is applied from the external power supply, the control unit 122 sets the capacity value of the capacitive element 112 and the inductance of the antenna coil such that the resonance characteristic 202 is the maximum and gentle at the frequency of the modulation signal near the carrier wave.

Figure 10:
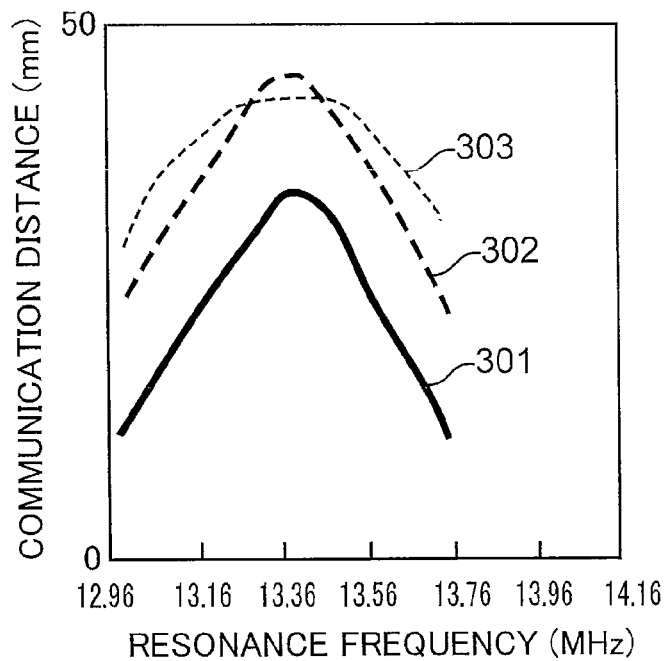
FIG. 10 is a diagram for explaining an antenna dependency characteristic of a communication distance obtained by a voltage is applied from an external power supply.
Figure 11:
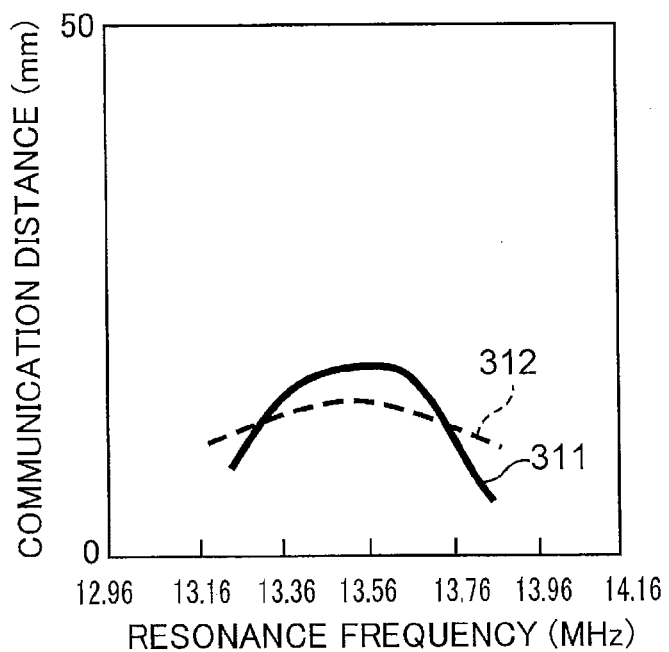
FIG. 11 is a diagram for explaining an antenna dependency characteristic of a communication distance obtained when a voltage is not applied from the external power supply.

Subsequently, antenna dependency of a communication distance is explained. FIG. 10 is a diagram for explaining an antenna dependency characteristic of a communication distance obtained by a voltage is applied from the external power supply. FIG. 11 is a diagram for explaining an antenna dependency characteristic of a communication distance obtained when a voltage is not applied from the external power supply. Note that, in FIGS. 10 and 11, the ordinate represents a communication distance (mm) and the abscissa represents a resonance frequency (MHz).

In FIG. 10, an antenna dependency characteristic 301 indicates an antenna dependency characteristic of an antenna coil, the number of turns of which is one. An antenna dependency characteristic 302 indicates an antenna dependency characteristic of an antenna coil, the number of turns of which is two. An antenna dependency characteristic 303 indicates an antenna dependency characteristic of an antenna coil, the number of turns of which is three.

In FIG. 11, an antenna dependency characteristic 311 indicates an antenna dependency characteristic of an antenna coil, the number of turns of which is one. An antenna dependency characteristic 312 indicates an antenna dependency characteristic of an antenna coil, the number of turns of which is two.

As shown in FIG. 10, when a voltage is applied from the external power supply, all of a communication distance of the antenna coil, the number of turns of which is one, a communication distance of the antenna coil, the number of turns of which is two, and a communication distance of the antenna coil, the number of turns of which is three, are the maximum when the resonance frequency is near 13.36 MHz. The communication distance of the antenna coil, the number of turns of which is one, is shorter than the communication distance of the antenna coil, the number of turns of which is two, and the communication distance of the antenna coil, the number of turns of which is three. Further, the antenna dependency characteristic 303 of the antenna coil, the number of turns of which is three, is gentler than the antenna dependency characteristic 301 of the antenna coil, the number of turns of which is one, and the antenna dependency characteristic 302 of the antenna coil, the number of turns of which is two.

On the other hand, as shown in FIG. 11, when a voltage is not applied from the external power supply, both of a communication distance of the antenna coil, the number of turns of which is one, and a communication distance of the antenna coil, the number of turns of which is two, is the maximum when the resonance frequency is near 13.56 MHz. The communication distance of the antenna coil, the number of turns of which is one, is longer than the communication distance of the antenna coil, the number of turns of which is two. Further, the antenna dependency characteristic 312 of the antenna coil, the number of turns of which is two, is gentler than the antenna dependency characteristic 311 of the antenna coil, the number of turns of which is one.

In this way, the communication distance is different depending on the number of turns of the antenna coil. It is seen that the communication distance is affected by the number of turns of the antenna coil, i.e., the inductance of the antenna coil. It is seen that the communication distance is also greatly different according to whether a voltage is applied from the external power supply.

Figure 12:
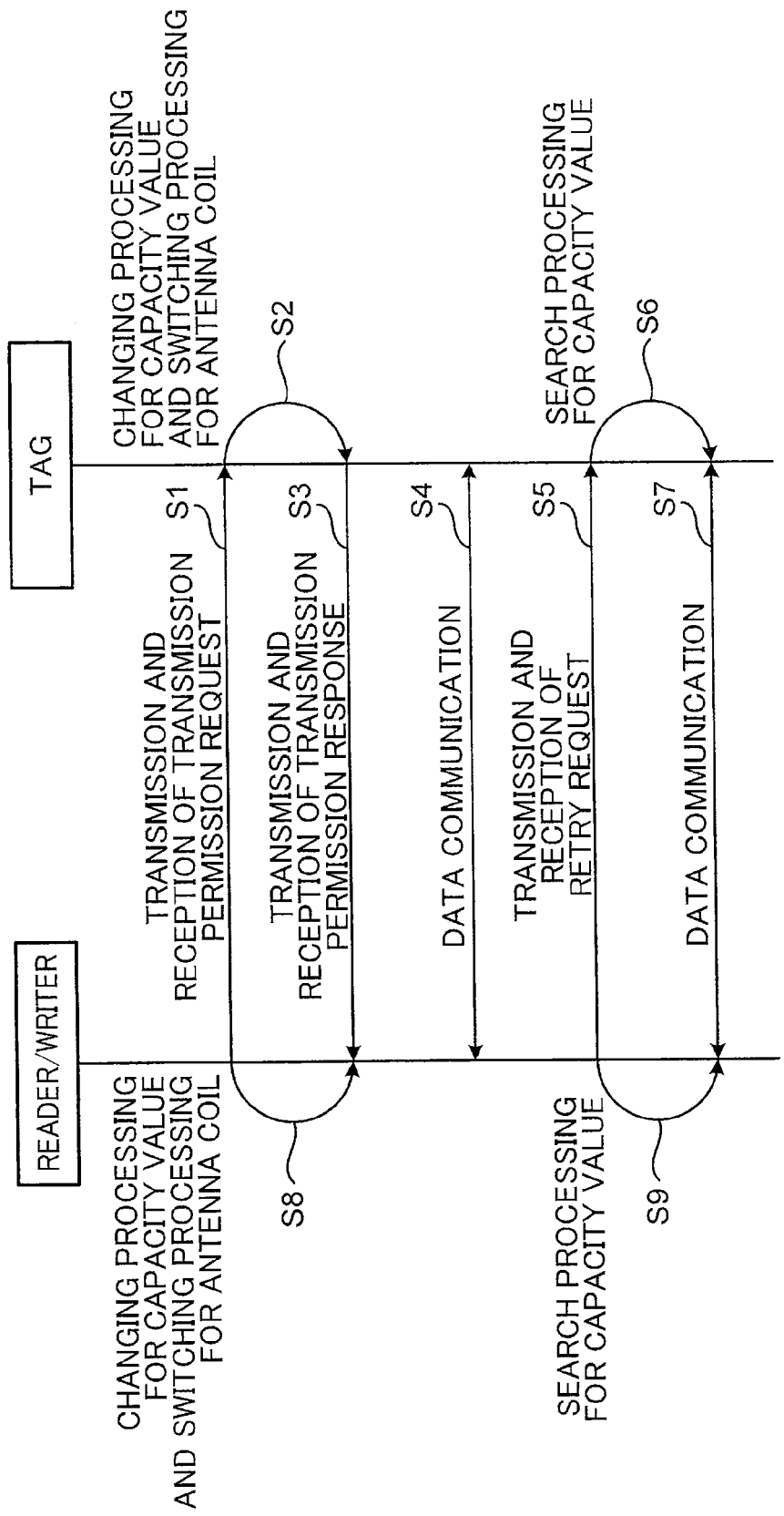
FIG. 12 is a sequence chart for explaining the operation of a communication system in the embodiment.

Next, the operation of the communication system in this embodiment is explained. FIG. 12 is a sequence chart for explaining the operation of the communication system in this embodiment.

First, in step S1, the transmitting and receiving unit 21 of the reader/writer 2 transmits a transmission permission request for requesting transmission of data to the RFID tag 1. Note that the transmission permission request includes standard information representing in which communication standard among a plurality of communication standards data is transmitted.

When the reader/writer 2 is adapted to a plurality of communication standards, the transmitting and receiving unit 21 sequentially transmits the transmission permission request in communication systems corresponding to the respective communication standards until the transmitting and receiving unit 21 receives a transmission permission response. That is, the transmitting and receiving unit 21 transmits the transmission permission request in, for example, a communication system corresponding to the communication standard of "Type A". If a transmission permission response is received, thereafter, the transmitting and receiving unit 21 transmits data in a communication system corresponding to the communication standard of "Type A". On the other hand, if a transmission permission response is not received, the transmitting and receiving unit 21 transmits the transmission permission request in a communication system corresponding to the communication standard of "Type B".

Subsequently, the transmitting and receiving unit 11 of the RFID tag 1 receives the transmission permission request transmitted by the transmitting and receiving unit 21. The transmitting and receiving unit 11 outputs the received transmission permission request to the signal processing circuit 121. The signal processing circuit 121 applies predetermined signal processing to the transmission permission request received by the transmitting and receiving unit 11. Subsequently, the signal processing circuit 121 outputs the communication standard information included in the received transmission permission request to the control unit 122.

Subsequently, in step S2, the control unit 122 performs changing processing for the capacity value of the capacitive element 112 and switching processing for the antenna coil.

The changing processing for the capacity value of the capacitive element 112 and the switching processing for the antenna coil are explained.

First, the control unit 122 outputs an operation mode read-out command for requesting operation mode information to the voltage monitor unit 124. Upon receiving the operation mode readout command from the control unit 122, the voltage monitor unit 124 outputs operation mode information indicating whether a voltage is applied to the external power supply to the control unit 122.

Subsequently, the control unit 122 acquires operation mode information from the voltage monitor unit 124. Subsequently, the control unit 122 refers to the reference table stored in the memory 123 and reads out a capacity value and an antenna coil corresponding to the communication standard information acquired from the signal processing circuit 121 and the operation mode information acquired from the voltage monitor unit 124.

FIG. 13 is a diagram showing an example of the reference table stored in the memory 123.

As shown in FIG. 13, the reference table associates capacity values and inductances (antenna coils) with a plurality of communication standards and with whether a voltage is applied from the external power supply. For example, a capacity value C1 and an inductor L1 are associated with the communication standard "Type A" and the external power supply "applied". A capacitance value C2 and an inductor L2 are associated with the communication standard "Type B" and the external power supply "applied". A capacity value C3 and an inductor L3 are associated with the communication standard "Type F" and the external power supply "applied". A capacity value C4 and an inductor L4 are associated with the communication standard "Type A" and the external power supply "not applied". A capacity value C5 and an inductor L5 are associated with the communication standard "Type B" and the external power supply "not applied". A capacity value C6 and an inductor L6 are associated with the communication standard "Type F" and the external power supply "not applied".

The capacity values C1 to C6 are values different from one another. When an inductor (an antenna coil) is fixed, it often occurs that the capacity value C1 is larger than the capacity value C4, the capacity value C2 is larger than the capacity value C5, and the capacity value C3 is larger than the capacity value C6. That is, when a voltage from the external power supply is not applied, a resonance frequency is desirably set high compared with a resonance frequency set when a voltage is applied from the external power supply. Therefore, from $f=1/\{2\pi(LC)^{0.5}\}$, the capacity value C4 is set to be smaller than the capacity value C1. Consequently, it is possible to increase the resonance frequency.

The inductors L1 to L6 respectively represent inductors different from one another. The control unit 122 selects antenna coils corresponding to the inductors L1 to L6. The inductances of the inductors L1 to L6 have a relation same as a relation of capacitance values of the capacitive element 112. That is, when a capacitance value of the capacitive element 112 is fixed, it is preferable that the inductance of the inductor L1 is larger than the inductance of the inductor L4, the inductance of the inductor L2 is larger than the inductance of the inductor L5, and the inductance of the inductor L3 is larger than the inductance of the inductor L6.

Note that, in the reference table shown in FIG. 13, the six inductors L1 to L6 are associated. However, the present invention is not specifically limited to this. For example, when the transmitting and receiving unit 11 includes the two antenna coils as shown in FIG. 2, two inductors are associated with a plurality of communication standards and with whether a voltage is applied from the external power supply.

In the reference table shown in FIG. 13, the capacity values and the inductors are associated with the three communication standards and with whether a voltage is applied from the external power supply. However, the present invention is not specifically limited to this. For example, when the RFID tag 1 corresponds to only one communication standard, the capacity values and the inductors may be associated with only whether a voltage is applied from the external power supply. In the reference table shown in FIG. 13, the capacity values and the inductors are associated with the plurality of communication standards and with whether a voltage is applied from the external power supply. However, the present invention is not specifically limited to this. For example, when an inductor (an antenna coil) cannot be switched, only the capacity values may be associated with the plurality of communication standards and with whether a voltage is applied from the external power supply.

Subsequently, the control unit 122 outputs a control signal for changing the capacity value of the capacitive element 112 to the read-out capacity value to the transmitting and receiving unit 11 and outputs a control signal for switching the present antenna coil to the read-out antenna coil to the transmitting and receiving unit 11.

Subsequently, the capacitive element 112 of the transmitting and receiving unit 11 changes the capacity value on the basis of a control signal output from the control unit 122. Next, the switch 113 of the transmitting and receiving unit 11 switches the antenna coil on the basis of a control signal output from the control unit 122.

As explained above, the changing processing for the capacity value of the capacitive element 112 and the switching processing for the antenna coil are performed.

Subsequently, in step S3, the control unit 122 outputs a control signal for transmitting a transmission permission response, which is a response signal to the transmission permission request, to the reader/writer 2 to the signal processing circuit 121. Subsequently, the signal processing circuit 121 outputs the transmission permission response to the transmitting and receiving unit 11 on the basis of the control signal output from the control unit 122. Subsequently, the transmitting and receiving unit 11 transmits the transmission permission response output from the signal processing circuit 121 to the reader/writer 2. Subsequently, the transmitting and receiving unit 21 of the reader/writer 2 receives the transmission permission response transmitted by the transmitting and receiving unit 11 of the RFID tag 1. Subsequently, the transmitting and receiving unit 21 outputs the received transmission permission response to the signal processing unit 22.

Subsequently, in step S4, upon receiving the transmission permission response, the signal processing unit 22 starts data communication in a communication standard at the time when the transmission permission request is transmitted.

That is, the signal processing unit 22 outputs data, which should be transmitted to the RFID tag 1, to the transmitting and receiving unit 21. The transmitting and receiving unit 21 transmits data output from the signal processing unit 22 to the RFID tag 1. The transmitting and receiving unit 11 of the RFID tag 1 receives the data transmitted by the transmitting and receiving unit 21 of the reader/writer 2 and outputs the received data to the signal processing circuit 121. The signal processing circuit 121 applies predetermined signal processing to the data received by the transmitting and receiving unit 11. Subsequently, the signal processing circuit 121 outputs the received data to the control unit 122. The control unit 122 creates data, which should be transmitted to the reader/writer 2, on the basis of the data output from the signal processing circuit 121 and outputs the data to the signal processing circuit 121. The signal processing circuit 121 outputs the data output from the control unit 122 to the transmitting and receiving unit 11. The transmitting and receiving unit 11 transmits the data output from the signal processing circuit 121 to the reader/writer 2.

As explained above, data communication between the reader/writer 2 and the RFID tag 1 is performed.

When communication is interrupted because of some cause during the data communication between the reader/writer 2 and the RFID tag 1, in step S5, the transmitting and receiving unit 21 of the reader/writer 2 transmits a retry request for performing the data communication again to the RFID tag 1. For example, when no response is received from the RFID tag 1 even if a predetermined time elapses, the control unit of the signal processing unit 22 of the reader/writer 2 determines that the communication is interrupted and instructs the transmitting and receiving unit 21 to transmit the retry request.

Subsequently, the transmitting and receiving unit 11 of the RFID tag 1 receives the retry request transmitted by the transmitting and receiving unit 21. The transmitting and receiving unit 11 outputs the received retry request to the signal processing circuit 121. The signal processing circuit 121 applies predetermined signal processing to the retry request received by the transmitting and receiving unit 11. Subsequently, the signal processing circuit 121 outputs a control signal to the control unit 122 in response to the received retry request.

Figure 14:
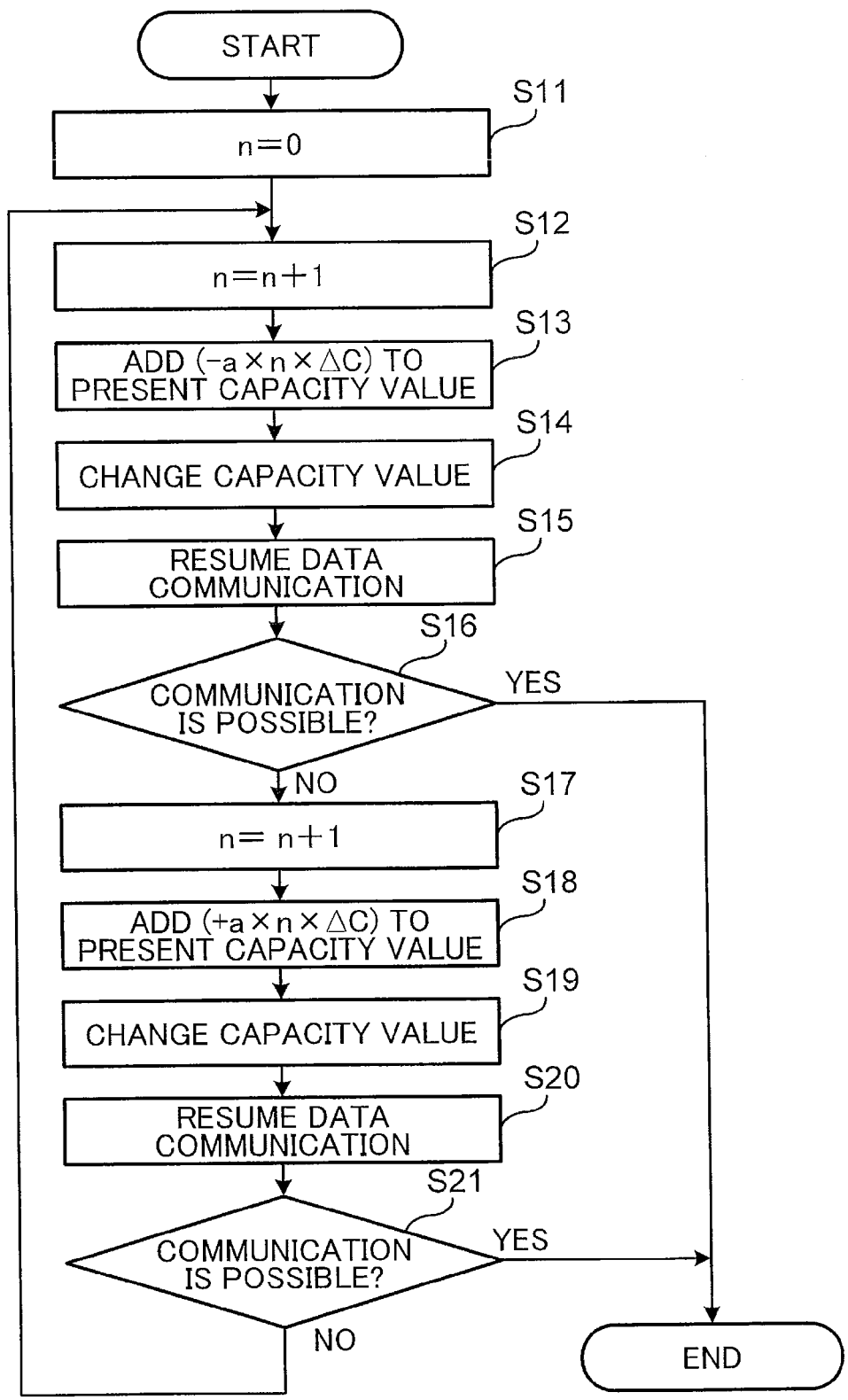
FIG. 14 is a flowchart for explaining an example of search processing for a capacity value of a capacitive element.

Subsequently, in step S6, the control unit 122 performs search processing for a capacity value of the capacitive element 112. FIG. 14 is a flowchart for explaining an example of the search processing for a capacity value of the capacitive element.

First, in step S11, the control unit 122 sets a variable n to 0.

Subsequently, in step S12, the control unit 122 increments the variable n.

Subsequently, in step S13, the control unit 122 multiplies together a negative coefficient −a (a is an integer), the variable n, and a change amount ΔC of a capacity value and adds a multiplied value to the present setting value of the capacity value to calculate a control value.

Subsequently, in step S14, the control unit 122 changes the capacity value of the capacitive element 112 to the calculated capacity value. That is, the control unit 122 outputs a control signal for changing the capacity value of the capacitive element 112 to the calculated capacity value to the transmitting and receiving unit 11. The capacitive element 112 of the transmitting and receiving unit 11 changes the capacity value on the basis of the control signal output from the control unit 122.

Subsequently, in step S15, the control unit 122 resumes the data communication. That is, the control unit 122 outputs the data, which was unable to be transmitted to the reader/writer 2, to the signal processing circuit 121. The signal processing circuit 121 outputs the data output from the control unit 122 to the transmitting and receiving unit 11. The transmitting and receiving unit 11 transmits the data output from the signal processing circuit 121 to the reader/writer 2.

Subsequently, in step S16, the control unit 122 determines whether data communication is possible. That is, the control unit 122 determines whether data communication is possible by determining whether, after the data is transmitted, the data transmitted by the reader/writer 2 is received. If the data from the reader/writer 2 is received, the control unit 122 determines that data communication is possible. If the data from the reader/writer 2 is not received and a predetermined time elapses, the control unit 122 determines that data communication is not possible.

When it is determined that data communication is possible (YES in step S16), the control unit 122 continues the data communication with the reader/writer 2 and ends the search processing for a capacity value of the capacitive element.

On the other hand, when it is determined that data communication is not possible (NO in step S16), in step S17, the control unit 122 increments the variable n.

Subsequently, in step S18, the control unit 122 multiplies together a positive coefficient +a (a is an integer), the variable n, and the change amount ΔC of the capacity value and adds a multiplied value to the present setting value of the capacity value to calculate a control value.

Subsequently, in step S19, the control unit 122 changes the capacity value of the capacitive element 112 to the calculated capacity value. That is, the control unit 122 outputs a control signal for changing the capacity value of the capacitive element 112 to the calculated capacity value to the transmitting and receiving unit 11. The capacitive element 112 of the transmitting and receiving unit 11 changes the capacity value on the basis of the control signal output from the control unit 122.

Subsequently, in step S20, the control unit 122 resumes the data communication. That is, the control unit 122 outputs the data, which was unable to be transmitted to the reader/writer 2, to the signal processing circuit 121. The signal processing circuit 121 outputs the data output from the control unit 122 to the transmitting and receiving unit 11. The transmitting and receiving unit 11 transmits the data output from the signal processing circuit 121 to the reader/writer 2.

Subsequently, in step S21, the control unit 122 determines whether data communication is possible. That is, the control unit 122 determines whether data communication is possible by determining whether, after the data is transmitted, the data transmitted by the reader/writer 2 is received. If the data from the reader/writer 2 is received, the control unit 122 determines that data communication is possible. If the data from the reader/writer 2 is not received and a predetermined time elapses, the control unit 122 determines that data communication is not possible.

When it is determined that data communication is possible (YES in step S21), the control unit 122 continues the data communication with the reader/writer 2 and ends the search processing for a capacity value of the capacitive element.

On the other hand, when it is determined that data communication is not possible (NO in step S21), the control unit 122 returns to the processing in step S12 and increments the variable n.

As explained above, the search processing for a capacity value of the capacitive element is performed. By multiplying together the negative coefficient −a (a is an integer), the variable n, and the change amount ΔC of the capacity value and adding the multiplied value to the present capacity value. Consequently, it is possible to move a resonance frequency in a direction in which a frequency decreases with respect to a reference frequency of a carrier wave. By multiplying together the positive coefficient +a (a is an integer), the variable n, and the change amount ΔC of the capacity value and adding the multiplied value to the present capacity value, it is possible to move a resonance frequency in a direction in which a frequency increases with respect to a reference frequency of a carrier wave. Therefore, it is possible to adjust a communication distance to an optimum communication distance by changing the capacity value.

Note that, in FIG. 14, only the search processing for a capacity value of the capacitive element is performed. However, search processing for the antenna coil may be further performed. When the search processing for an antenna coil is performed after step S13 or S14 in FIG. 14, the control unit 122 selects one antenna coil out of a plurality of antenna coils and outputs a control signal to the switch 113 to switch the present antenna coil to the selected antenna coil. The switch 113 switches the antenna coil on the basis of the control signal from the control unit 122. In step S15, the control unit 122 resumes the data communication. Similarly, when the search processing for an antenna coil is performed, after steps S18 or S19 in FIG. 14, the control unit 122 selects one antenna coil out of a plurality of antenna coils and outputs a control signal to the switch 113 to switch the present antenna coil to the selected antenna coil.

Note that the change of the capacity value and the switching of the antenna coil may be performed together or only one of the change of the capacity value and the switching of the antenna coil may be performed. For example, the control unit 122 sequentially changes only the capacity value and, when the capacity value cannot be further changed, switches the antenna coil and sequentially changes the capacity value again. By repeating this, the change of the capacity value and the switching of the antenna coil are performed.

When it is determined in step S16 or S21 that communication is possible, the control unit 122 may store, in the reference table, the changed present capacity value in association with whether a voltage is applied from the external power supply and a communication standard.

Referring back to FIG. 12, in step S7, the transmitting and receiving unit 21 of the reader/writer 2 receives the data transmitted by the transmitting and receiving unit 11 of the RFID tag 1 and outputs the received data to the signal processing unit 22. Upon receiving the data from the RFID tag 1, the signal processing unit 22 resumes the data communication.

Note that, in the reader/writer 2, processing same as the changing processing for the capacity value and the switching processing for the antenna coil in step S2 in FIG. 12 may be performed. That is, in step S8 of FIG. 12, the control unit of the signal processing unit 22 of the reader/writer 2 performs changing processing for a capacity value of the capacitive element and switching processing for an antenna coil. The changing processing for a capacity value of the capacitive element and the switching processing for an antenna coil in the reader/writer 2 are the same as the changing processing for a capacity value of the capacitive element and the switching processing for an antenna coil in the RFID tag 1. Therefore, explanation thereof is omitted.

In the reader/writer 2, processing same as the search processing for a capacity value (and the search processing for an antenna coil) in step S6 in FIG. 12 is performed. That is, in step S9 in FIG. 12, the control unit of the signal processing unit 22 of the reader/writer 2 performs search processing for a capacity value (and search processing for an antenna coil). The search processing for a capacity value (and the search processing for an antenna coil) in the reader/writer 2 is the same as the search processing for a capacity value (and the search processing for an antenna coil) in RFID tag 1. Therefore, explanation thereof is omitted.

In this way, in this embodiment, the capacity value of the capacitive element 112 is changed according to whether a voltage is applied from the external power supply. Therefore, it is possible to adjust a communication distance to an optimum communication distance when a voltage is applied from the external power supply and when a voltage is not applied from the external power supply.

Note that the RFID tag 1 in this embodiment includes the capacitive element 112 arranged in series between the first and second antenna coils 111a and 111b and the signal processing circuit 121 and the switch 113 configured to switch the antenna coil to any one of the first and second antenna coils 111a and 111b. However, the present invention is not specifically limited to this. The capacitive element may further include a first capacitive element arranged in series between the first antenna coil 111a and the signal processing circuit 121 and a second capacitive element having a capacity value different from the capacity value of the first capacitive element and arranged in series between the second antenna coil 111b and the signal processing circuit 121. The RFID tag 1 may further include a switch configured to switch the capacitive element to any one of the first and second capacitive elements. In this case, the inductances of the first and second antenna coils 111a and 111b may be the same or may be different from each other.

In this way, the RFID tag 1 may include a plurality of capacitive elements respectively arranged in series between the plurality of antenna coils and the signal processing circuit and having capacity values different from one another rather than including a variable capacitive element. The control unit 122 may change the capacity value of the capacitive element by switching the plurality of capacitive elements according to whether a voltage is applied from the external power supply.

Note that the specific embodiment explained above mainly include inventions having configurations explained below.

A communication apparatus according to an aspect of the present invention includes: an antenna configured to transmit and receive a signal through near field communication; a signal processing circuit configured to process the signal transmitted and received by the antenna; a capacitive element arranged in series between the antenna and the signal processing circuit; and a control unit configured to control a capacity value of the capacitive element. The control unit changes the capacity value of the capacitive element according to whether a voltage is applied from an external power supply.

With this configuration, the antenna transmits and receives a signal through the near field communication. The signal processing circuit processes the signal transmitted and received by the antenna. The capacitive element is arranged in series between the antenna and the signal processing circuit. The control unit controls a capacity value of the capacitive element. The control unit changes the capacity value of the capacitive element according to whether a voltage is applied from the external power supply.

According to the present invention, the capacitance value of the capacitive element is changed according to whether a voltage is applied from the external power supply. Therefore, it is possible to adjust a communication distance to an optimum communication distance when a voltage is applied from the external power supply and when a voltage is not applied from the external power supply.

In the communication apparatus, it is preferable that the antenna includes a plurality of antenna coils having inductances different from one another, the communication apparatus further includes a switch configured to switch an antenna coil to any one of the plurality of antenna coils, and the control unit controls the switch to switch the antenna coil to any one of the plurality of antenna coils, according to whether a voltage is applied from the external power supply.

With this configuration, the antenna includes the plurality of antenna coils having inductances different from one another. The switch switches the antenna coil to any one of the plurality of antenna coils. The control unit controls the switch to switch the antenna coil to any one of the plurality of antenna coils, according to whether a voltage is applied from the external power supply.

Therefore, the antenna coil is switched to any one of the plurality of antenna coils having inductances different from one another according to whether a voltage is applied from the external power supply. Therefore, it is possible to more accurately adjust the communication distance.

It is preferable that the communication apparatus further includes: a storing unit configured to store a reference table that associates the capacity value with whether a voltage is applied from the external power supply; and a voltage monitor unit configured to monitor whether a voltage is applied from the external power supply and output operation mode information representing whether a voltage is applied from the external power supply, and the control unit reads out, from the reference table, a capacity value corresponding to the operation mode information output by the voltage monitor unit and change the present capacity value of the capacitive element to the read-out capacity value.

With this configuration, the storing unit stores the reference table that associates the capacity value with whether a voltage is applied from the external power supply. The voltage monitor unit monitors whether a voltage is applied from the external power supply and outputs operation mode information representing whether a voltage is applied from the external power supply. The control unit reads out, from the reference table, a capacity value corresponding to the operation mode information output by the voltage monitor unit and changes the present capacity value of the capacitive element to the read-out capacity value.

Therefore, since a capacity value corresponding to the operation mode information output by the voltage monitor unit is read out from the reference table and the present capacity value of the capacitive element is changed to the read-out capacity value, it is possible to easily change the capacity value.

In the communication apparatus, it is preferable that the communication apparatus performs communication according to a plurality of communication standards, the reference table associates the capacity value with whether a voltage is applied from the external power supply and with the plurality of communication standards, the antenna receives a signal transmitted from another communication apparatus and including communication standard information for specifying a communication standard, and the control unit reads out, from the reference table, a capacity value corresponding to the communication standard information included in the received signal and the operation mode information output by the voltage monitor unit and changes the present capacity value of the capacitive element to the read-out capacity value.

With this configuration, the communication apparatus performs communication according to the plurality of communication standards. The reference table associates the capacity value with whether a voltage is applied from the external power supply and with the plurality of communication standards. The antenna receives a signal transmitted from another communication apparatus and including communication standard information for specifying a communication standard. The control unit reads out, from the reference table, a capacity value corresponding to the communication standard information included in the received signal and the operation mode information output by the voltage monitor unit and changes the present capacity value of the capacitive element to the read-out capacity value.

Therefore, it is possible to change the capacity value and adjust a communication distance to a more optimum communication distance according to whether a voltage is applied to the external power supply and what kind of a communication standard the near field communication is.

It is preferable that the communication apparatus further includes: a storing unit configured to store a reference table that associates the capacity value and the antenna coil with whether a voltage is applied from the external power supply; and a voltage monitor unit configured to monitor whether a voltage is applied from the external power supply and output operation mode information representing whether a voltage is applied from the external power supply, and the control unit reads out, from the reference table, a capacity value and an antenna coil corresponding to the operation mode information output by the voltage monitor unit, changes the present capacity value of the capacitive element to the read-out capacity value, and switches the present antenna coil to the read-out antenna coil.

With this configuration, the storing unit stores a reference table that associates the capacity value and the antenna coil with whether a voltage is applied from the external power supply. The voltage monitor unit monitors whether a voltage is applied from the external power supply and outputs operation mode information representing whether a voltage is applied from the external power supply. The control unit reads out, from the reference table, a capacity value and an antenna coil corresponding to the operation mode information output by the voltage monitor unit, changes the present capacity value of the capacitive element to the read-out capacity value, and switches the present antenna coil to the read-out antenna coil.

Therefore, a capacity value and an antenna coil corresponding to the operation mode information output by the voltage monitor unit are read out from the reference table, the present capacity value of the capacitive element is changed to the read-out capacity value, and the present antenna coil is switched to the read-out antenna coil. Therefore, it is possible to easily change the capacity value and easily switch the antenna coil.

In the communication apparatus, it is preferable that the communication apparatus performs communication according to a plurality of communication standards, the reference table associates the capacity value and the antenna coil with whether a voltage is applied from the external power supply and with the plurality of communication standards, the antenna receives a signal transmitted from another communication apparatus and including communication standard information for specifying a communication standard, and the control unit reads out, from the reference table, a capacity value and an antenna coil corresponding to the communication standard information included in the received signal and the operation mode information output by the voltage monitor unit, changes the present capacity value of the capacitive element to the read-out capacity value, and switches the present antenna coil to the read-out antenna coil.

With this configuration, the communication apparatus performs communication according to a plurality of communication standards. The reference table associates the capacity value and the antenna coil with whether a voltage is applied from the external power supply and with the plurality of communication standards. The antenna receives a signal transmitted from another communication apparatus and including communication standard information for specifying a communication standard. The control unit reads out, from the reference table, a capacity value and an antenna coil corresponding to the communication standard information included in the received signal and the operation mode information output by the voltage monitor unit, changes the present capacity value of the capacitive element to the read-out capacity value, and switches the present antenna coil to the read-out antenna coil.

Therefore, it is possible to change the capacity value, switch the antenna coil, and adjusts a communication distance to a more optimum communication distance according to whether a voltage is applied from the external power supply what kind of a communication standard the near field communication is.

In the communication apparatus, it is preferable that, when communication is interrupted during data communication or when, although polling communication is successful, data communication does not start, the signal processing circuit carries out a reception operation for a data signal while the control unit changes the capacity value, and the control unit controls the capacitive element with the capacity value at a point when the data signal is received.

With this configuration, when communication is interrupted during data communication or when, although polling communication is successful, data communication does not start, the signal processing circuit carries out a reception operation for a data signal while the control unit changes the capacity value. The control unit controls the capacitive element with the capacity value at a point when the data signal is received.

Therefore, even when communication is interrupted during data communication or when, although polling communication is successful, data communication does not start, it is possible to change a communication distance to an optimum communication distance and resume the data communication by changing the capacity value of the capacitive element again.

Note that the specific implementation modes or the examples made in the section of the Description of Embodiments are solely for clarifying the technical contents of the present invention, should not be narrowly interpreted to be limited to such specific examples, and can be variously changed and carried out within the scope of the spirit of the present invention and the claimed matters.

INDUSTRIAL APPLICABILITY

The communication apparatus according to the present invention is useful for a communication apparatus that can adjust a communication distance to an optimum communication distance and performs communication using the near field communication.

The invention claimed is:

1. A communication apparatus comprising:
an antenna configured to transmit and receive a signal through near field communication;
a signal processing circuit configured to process the signal transmitted and received by the antenna;
a capacitive element arranged in series between the antenna and the signal processing circuit;
a voltage monitor unit configured to monitor whether a voltage for operating the communication apparatus supplied by a) an external power supply or b) from another communication apparatus via the antenna and output operation mode information representing whether a voltage is applied from the external power supply;
a storing unit configured to store a reference table that associates a capacity value of the capacitive element with whether a voltage is applied from the external power supply and with a plurality of communication standards; and
a control unit configured to control the capacity value of the capacitive element, wherein
the antenna receives a signal transmitted from another communication apparatus and including communication standard information for specifying a communication standard, the control unit reads out, from the reference table, a capacity value corresponding to the communication standard information included in the received signal and the operation mode information output by the voltage monitor unit and changes a present capacity value of the capacitive element to the read-out capacity value, and
the capacity value read out from the reference table is a value different according to the communication standard information and the operation mode information.

2. The communication apparatus according to claim 1, wherein, when communication is interrupted during data communication or when, although polling communication is successful, data communication does not start, the signal processing circuit carries out a reception operation for a data signal while the control unit changes the capacity value, and the control unit controls the capacitive element with the capacity value at a point when the data signal is received.

3. A communication apparatus comprising:
an antenna configured to transmit and receive a signal through near field communication and including a plurality of antenna coils having inductances different from one another;
a switch configured to switch an antenna coil to anyone of the plurality of antenna coils;
a signal processing circuit configured to process the signal transmitted and received by the antenna;
a capacitive element arranged in series between the antenna and the signal processing circuit;
a voltage monitor unit configured to monitor whether a voltage for operating the communication apparatus is supplied by a) an external power supply or b) from another communication apparatus via the antenna, and output operation mode information representing whether a voltage is applied from an external power supply;
a storing unit configured to store a reference table that associates a capacity value of the capacitive element and the antenna coil with whether a voltage is applied from the external power supply and with a plurality of communication standards; and
a control unit configured to control the capacity value of the capacitive element, wherein
the antenna receives a signal transmitted from another communication apparatus and including communication standard information for specifying a communication standard, the control unit reads out, from the reference table, a capacity value and an antenna coil corresponding to the communication standard information included in the received signal and the operation mode information output by the voltage monitor unit, changes a present capacity value of the capacitive element to the read-out capacity value, and instructs the switch to switch a present antenna coil to the read-out antenna coil, and
the capacity value read out from the reference table is a value different according to the communication standard information and the operation mode information.

* * * * *